United States Patent [19]

Sudler

[11] Patent Number: 4,973,867
[45] Date of Patent: Nov. 27, 1990

[54] STEPPING MOTOR DRIVE

[75] Inventor: Roland Sudler, Frankfurt am Main, Fed. Rep. of Germany

[73] Assignee: VDO Adolf Schindling AG, Frankfurt am Main, Fed. Rep. of Germany

[21] Appl. No.: 389,968

[22] Filed: Aug. 4, 1989

[30] Foreign Application Priority Data

Aug. 22, 1988 [DE] Fed. Rep. of Germany ....... 3828463

[51] Int. Cl.⁵ ..................... H02K 37/14; G01C 22/02
[52] U.S. Cl. ............................. 310/49 R; 310/75 R; 235/95 R; 235/96
[58] Field of Search ................. 310/49 R, 75 R; 235/95 R, 96, 97

[56] References Cited

U.S. PATENT DOCUMENTS 4,930,094  5/1990  Luitje et al. ..................... 235/96

FOREIGN PATENT DOCUMENTS 1115062  11/1958  Fed. Rep. of Germany ........ 235/97
0123187   5/1988  Japan ..................................... 235/97

Primary Examiner—Steven L. Stephan
Assistant Examiner—Judson H. Jones
Attorney, Agent, or Firm—Martin A. Farber

[57] ABSTRACT

A device for setting a resettable mechanical counter, has a stepping motor (1) which is developed as two-phase stepping motor having a rotor (32) consisting of a permanent magnet (33) with diametrically opposite permanent magnet poles and a coil arrangement (10, 11) with coils which are arranged at an angular distance apart of, in particular, 90°. The stepping motor is connected to the counter via a gearing (2). In order to effect the resetting of the counter with the same stepping motor and with a compact construction of the device, the stepping motor has a coil body (14) to receive the coils, the coil body being divided into two parts (15, 16). Bearings (36, 37) of the shaft of the rotor being so formed in the coil body that the shaft extends out of the coil body (14) on at least the front outer end (12). The coil body has, for this purpose, furthermore, fastening elements on one outer end of one of the two parts for the attachment of an intermediate body which encloses the gearing. A shaft with a pinion (13) which extends out of the forward end (12) of the coil body (1) engages into the gearing. Aside from the counter, the gearing is also connected via a freewheel clutch (91–94) to a resetting device (zeroing lever 89) of the counter (cipher roll 79).

18 Claims, 10 Drawing Sheets

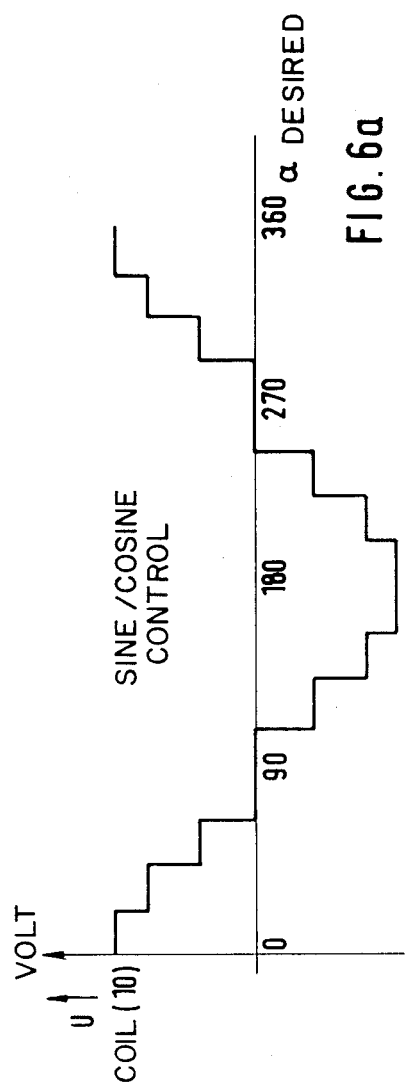
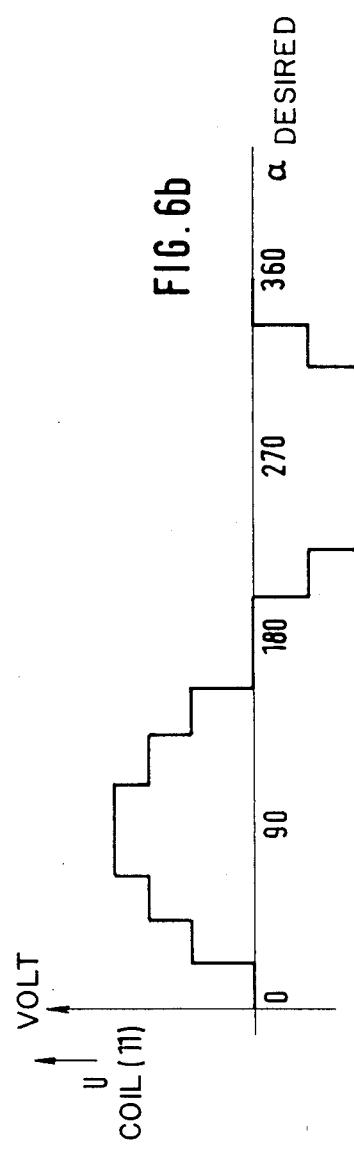

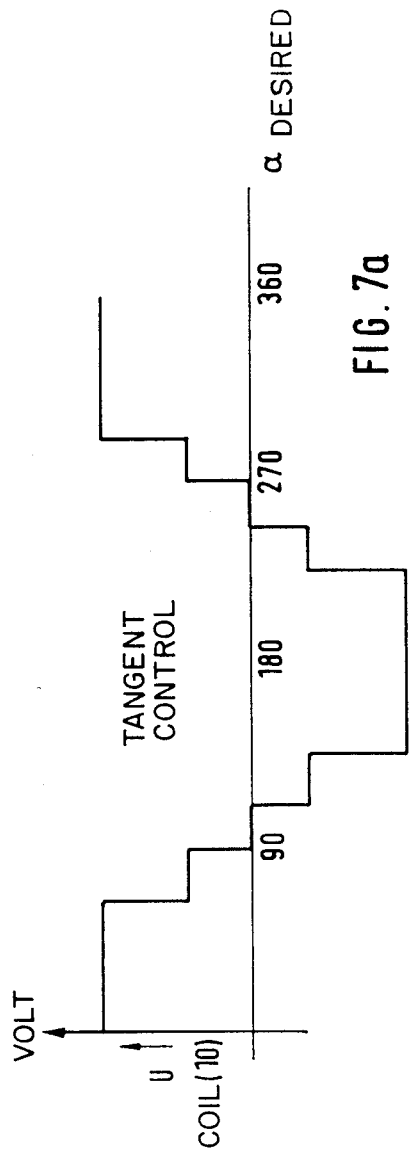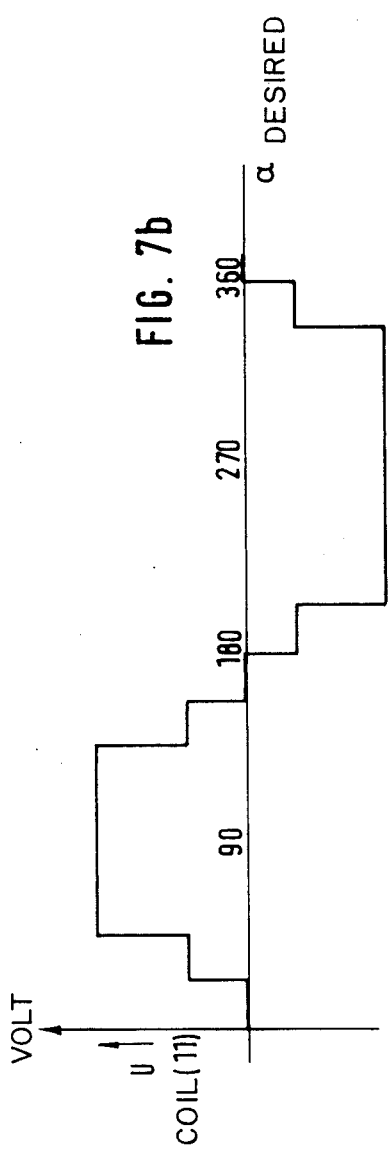

4,973,867

STEPPING MOTOR DRIVE

FIELD AND BACKGROUND OF THE INVENTION

The present invention relates to a cross-coil rotary magnet device, particularly a device for setting a resettable mechanical counter, in particular a roller-type counter for measurement of distance travelled, having a stepping motor which is developed as two-phase stepping motor with a rotor which consists, in particular, of a permanent magnet with diametrically opposite permanent magnet poles, and having a coil arrangement with coils arranged at an angular distance apart of, in particular, 90°, and which is connected to the counter via a gearing.

One known cross-coil rotary magnet device is developed especially as a motor for driving a clockwork (Federal Republic of Germany OS No. 34 19 100). In that motor a rotatably mounted rotor has diametrically opposite permanent magnet poles. A multi-phase coil arrangement serves to produce a magnetic field which deflects the rotor as a function of control signals which are applied to coils of the coil arrangement. For this purpose the coil arrangement has several coils which surround the rotor, are arranged at equal angular distances apart and can be controlled by sinusoidal voltages staggered by a given phase shift. The coil arrangement consists, in particular, of two coils arranged at right angles to each other, and which are fed with two sinusoidal voltages which are 90° apart. The axis of rotation or shaft can be the seconds arbor or minutes arbor of the clockwork. In the last-mentioned case, a minute hand is attached to one end of the rotary shaft and can be moved over a dial. An hour wheel which has an hour tube surrounding the rotary shaft, is driven by a drive pinion arranged on the rotary shaft and a minute wheel.

The foregoing motor, which is developed for driving a clockwork and is provided with drive pinion, minute wheel and hour wheel as well as an hour tube, is not intended for setting a resettable mechanical counter. Nor is it amenable to construct for this purpose a compact structural unit, in particular with a roller type counter. There is furthermore lacking a resetting device for the counter.

In a device of the state of the art for the indicating of a mechanical variable, in particular the speed of a motor vehicle, a measuring mechanism is provided for setting a pointer, the measuring mechanism being connected via a converter to a transmitter which produces a pulse having a pulse frequency which is proportional to the measurement variable (Federal Republic of Germany OS No. 27 30 699). A stepping motor which travels forward and backward serves as measuring mechanism. The stepping motor is fed with a sign-valued pulse train which is produced from counting values which are formed during successive defined time intervals as a function of the measurement variable and which, when compared to each other, result in a sign-valued difference value. The stepping motor which sets itself corresponding to this difference value is coupled to an indicator mechanism via a gearing. The foregoing stepping motor, however, is not readily suitable for the setting of a resettable mechanical counter, in particular a roller type counter for measurement of distance travelled, since a resetting by the driving pinion of the stepping motor, if it would work at all, would at least take too long as far as the rollers for the higher numerical positions are concerned.

Odometers or other roller type counters are customarily driven by a stepping motor which rotates only in one direction. The resetting of the counter takes place either manually, by a stroke magnet or an additional motor. The resetting takes place in this connection via a so-called zero setting shaft which, in its turn, can reset the individual rollers of a roller-type counter via heart cams by a brief turn of at most 180°. A separate drive with resetting mechanism is required for this type of resetting.

SUMMARY OF THE INVENTION

It is an object of the present invention to achieve rapid resetting of a mechanical counter, in particular a roller-type counter, by means of only a single stepping motor. The stepping motor, a gearing coupled to it for driving the counter, and the resetting device are to form a compact unit.

According to the present invention, the stepping motor has a coil body (14) which is divided into two parts (15, 16) to receive the coils and in which bearings (36, 37) of the shaft (35) of the rotor (32) are developed in the manner that the shaft protrudes out of the coil body (14) at least one front outer end (12), one of the two parts (15, 16) of the coil body (14) having fastening elements on this front end for the attachment of an intermediate body (2) which surrounds the gearing into which the shaft (35) protruding out of the front end (12) of the coil body (1) engages by means of a pinion (13), and the gearing is connected in addition to the counter via a freewheel clutch (91-94) to a resetting device (zeroing lever 89) of the counter (cipher roller 79).

By the development of the stepping motor with a divided coil body on the front end of which the gearing which is enclosed in an intermediate body can be attached or clipped with a pinion engaging into the gearing in a groove protruding out of the coil body, there is created a space-saving unit on which the additional freewheel clutch provided in accordance with the invention as well as the counter, in particular the roller-type counter, with corresponding resetting device, can be attached while maintaining the compact construction. Due to the fact that the gearing is connected to the counter via a freewheel clutch and also to the resetting device of the counter, the stepping motor can, in addition to the customary function for the setting of the counter upon a counting, also serve in the resetting of the counter via a zeroing shaft or other resetting device. This is accomplished in the manner that an element which is coupled to the gearing, in particular a cam disk, acts on the resetting device upon a backward turning of the stepping motor, while this element, in particular the cam disk, is uncoupled upon the forward rotation of the stepping motor, when the counter is set for counting. As a result of the freewheeling, therefore, the functional separation counting and resetting can take place without further control measures solely as a function of the direction of rotation of the stepping motor. The entire device can be realized with only a few uncomplicated parts and thus in a manner favorable for manufacture; it is wear-resistant and strong.

A particularly compact construction of the device for setting a roller type counter with space-saving internal toothing is made possible by a further development, namely that the driven shaft (3) of the gearing which extends out of the intermediate body (2) on the side (8) thereof facing away from the coil body (14), is arranged eccentrically. In this way, the roller type counter together with its main shaft can be arranged coaxially with the motor shaft and the main shaft of the gearing to assume a preferably approximately cylindrical shape in which the individual components of the device motor, gearing, roller-type counter succeed each other practically without any axial gaps. The pinion on the driven shaft of the gearing engages in this case in space-saving and protected manner into an internal toothing of a first driving wheel of the roller type counter.

The device is, in this connection, advantageously further developed in detail in the manner that the freewheel clutch (91–94) is developed in a first driving wheel of the roller type counter. The first driving wheel has a driving disk (85) connected to the driven shaft (3) of the gearing and a cam (78) which is coaxially mounted rotatable with the drive disk and which has a cam projection (88) which actuates the resetting device, and that at least one wedge space having a movable driving element (ball 93) is so developed between the drive disk and the cam disk that upon a rotation of the drive disk (85) in a first direction (R 1), the drive disk and the cam disk (78) are wedged against each other by the driving element and in a second direction, opposite direction of rotation (R 2), the drive disk moves freely with respect to the cam disk. The cam disk for resetting the zeroing shaft or some other resetting device and the free-wheeling clutch enclosed by the cam disk cause, in this connection, only a relatively slight axial extension of a normal first driving wheel.

This is true, in particular, if the device is developed in a manner such that the cam disk (78) partially surrounds the drive disk (85) with a cylindrical inner part (90), and that two diametrically opposite wedge spaces (91, 92) are formed in a surrounded inner section (90) of the drive disk. The freewheeling clutch can be realized in various ways: A ball as movable driving element (93) is particularly low in friction.

With the roller as movable driving element, even larger forces can be transmitted with relatively little friction.

A wedge as movable driving element is particularly robust.

As an alternative to the development of the freewheel clutch with two diametrically opposite wedge spaces each of which contains one of the above-mentioned driving elements, the free-wheel clutch can be constructed with a ratchet and pawl mechanism wherein the freewheel clutch is developed as a ratchet and pawl mechanism on a first drive wheel (96) of the roller-type counter. The latter mechanism comprises a ratchet wheel (97) on the first driving wheel (96) as well as a pawl (99) which engages into the ratchet wheel and is connected to the resetting device (zeroing lever 89). The ratchet and wheel mechanism can be of conventional type; no special construction is required.

Further advantageous developments of the stepping motor as part of the device for setting the counter are indicated as follows:

For the simple manufacture of the components of the stepping motor and for its assembly, the coil body is divided essentially in a cross-sectional plane, i.e. perpendicular to the shaft installed between the two parts of the coil body; that is, the coil body (14) is divided essentially in a cross-sectional plane (A—A).

In order to achieve the above-mentioned advantages, one of the bearings (36, 37) of the shaft (35) is furthermore advisedly developed from each of the two parts (15, 16) of the coil body (14). The rotor is arranged between the two bearings in the cylindrical inner space of the coil body. Two windings are so arranged staggered 90° with respect to each other on the coil body as stator that the conductors are located parallel to the shaft in each case between two webs arranged adjacent to each other on the circumference.

The stator of the stepping motor is advantageously developed in a manner such that the coil body (14) is formed cylindrically on the inside with four webs (17–20) arranged at equal distances apart over the circumference and extending cylindrically on the outside, and that a screening ring (48), with which the intermediate body is aligned, can be pushed concentrically over the coil body (14). In this way, a detent action or detent moment which determines defined positions of the rotor is exerted on the rotor without salient poles, due to the magnetic return. Due to the detent moment when the winding is not excited, control of winding current can take place with short pulses which mean a low average consumption of current. It is thus not necessary to feed the stepping motor with sinusoidal voltages.

For use as two-phase stepping motor, a damping of the rotor movement is achieved with a screening ring of non-annealed low-grade iron which has a residual coercive field strength of about 5 Oe.

The fastening elements provided on the coil body (14) are nose-shaped clips (24–27) for the clamping attachment of the intermediate body, whereby a precise centering and proper positioning and attachment of the intermediate body to the gearing are obtained.

According to a further feature of the invention, the concentric screening ring (48) on the coil body (14) abuts axially against a raised inner side of the clips (24–27).

The connecting pins (44–47) which are passed through the paraxial bore holes (38–43) and on which the stepping motor can be fastened are provided in the coil body (14) parallel to the shaft (35) and extend at least from one outer side of the coil body (14) out of the latter and possibly out of a gearing placed on the coil body in the intermediate piece. If the connecting pins extend out of a rear outer end of the coil body, then a printed circuit board can, for example, be attached thereto.

BRIEF DESCRIPTION OF THE DRAWINGS

With the above and other objects and advantages in view, the present invention will become more clearly understood in connection with a detailed description of preferred embodiments, when considered with the accompanying drawing, of which:

FIG. 2 is a longitudinal section essentially through the basic system of the stepping motor but with screening ring and pinion placed on;

FIG. 3 is a section according to FIG. 2 but with the intermediate piece, which contains a gearing, placed on;

FIGS. 6a, 6b are graphs of the variation with time of the voltages with which coils of the stepping motor are fed, in a first variant (sine/cosine-control);

FIGS. 7a, 7b are corresponding graphs of the variations with time of the voltages in a second variant (tangent control);

DETAILED DESCRIPTION OF THE PREFERRED EMBODIMENTS

Figure 1:
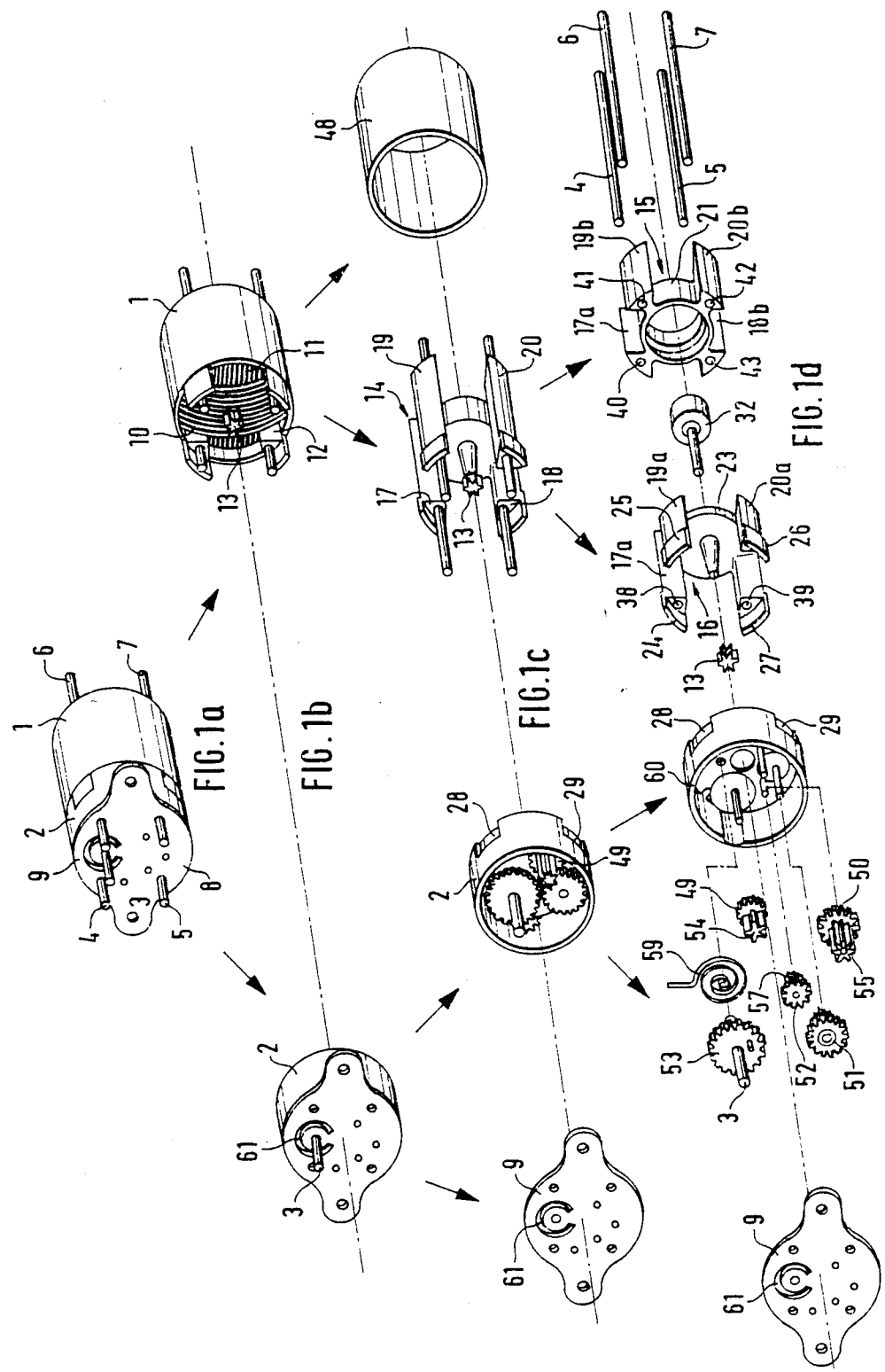
FIGS. 1a–1d is a perspective view of an embodiment of the stepping motor with a gearing arranged in the intermediate body, with increasing degree of disassembly of the arrangement in FIGS. 1b–1d shown in the form of exploded views.

FIG. 1a shows in assembled condition a stepping motor with gearing clipped on in an intermediate body 2. The longitudinal dimensions of the stepping motor and of the intermediate body result in the relatively small height h of the arrangement which is controlling for the installation. FIG. 1a furthermore shows a driven shaft 3 of the gearing which extends in forward direction eccentrically out of the intermediate body 2. (This driven shaft is shown in FIG. 1a in reverse position—upside-down—with respect to the position of FIG. 8.) Connecting pins which extend through the stepping motor and intermediate body and on both sides at the outer ends of this arrangement and can serve for the attachment of this arrangement are designated 4-7. The front outer end of this arrangement is designated 8; it is formed by plate 9 which closes off the intermediate body in front. The outer ends of the stepping motor itself are concealed in FIG. 1a.

In FIG. 1b the intermediate body, which contains the gearing, has been removed from the stepping motor so that two coils 10 and 11 which are arranged at an angular distance of 90 from each other can be noted in the stepping motor, the coils forming together a cross-coil or a two-phase winding. A pinion 13 which is fastened on a shaft extends out of a front outer end 12 of the stepping motor, which pinion, as described further below, can be so introduced into the gearing in the intermediate body that it comes into engagement with a gear in the gearing.

Further details of the construction, in particular of the stepping motor, can be noted from FIGS. 1c and 1d:

According thereto, a coil body which is generally designated 14 and is divided essentially in a cross-sectional plane A—A—See FIG. 1—consists of two coil body parts 15 and 16.

The coil body 15 is shaped cylindrically on the inside and has four webs 17-20 which are curved cylindrically on their outer side. According to FIG. 1d, the webs are formed, in each case, of one front web section 17a, 18a, 19a, 20a, and one rear web section 17b, 18b, 19b, 20b, which have the same cross-sectional shapes. The webs are shaped in such a manner that they form chambers between them to receive the two coils 10 and 11. The rear web sections 17b, 18b, 19b, 20b converge to form a cylindrical ring 21 which is closed on the inside by an intermediate wall 22—see FIG. 2. The front web sections 17a, 18a, 19a, 20a, on the other hand, are formed on a front wall 23. Tongue-shaped clips 24, 25, 26, 27 protrude from the front web sections 17a, 18a, 19a, 20a, the clips being provided for form-locked and force-locked engagement into corresponding recesses in the intermediate body 2 in order to hold the latter clamped. The recesses 28 and 29 can be noted in FIGS. 1c and 1d. The recesses are groove-shaped and also serve as centering means since they are distributed at equal distances apart over the circumference of the intermediate body.

Figure 2:
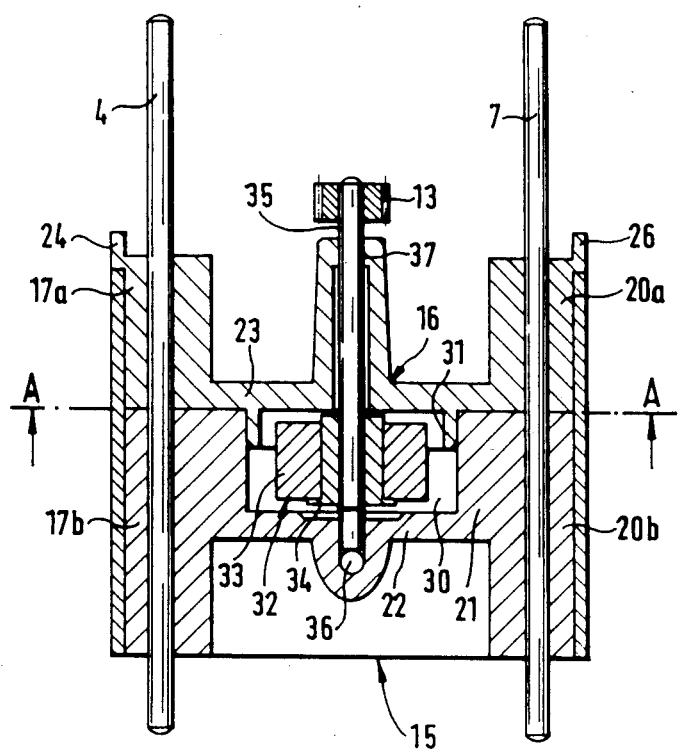

The cylindrical ring 21 of the coil-body part 15 encloses an inner space 30 which is also cylindrical and which is closed off towards the front or, in FIG. 2, on top by the front wall 23 of the coil-body part 16, which wall is provided with a cylindrical extension 31. A rotor, generally designated 32, is mounted in the cylindrical inner space 30. The rotor consists essentially of a permanent magnet 33 (FIG. 2) which is magnetized, forming diametrically opposite poles. The rotor is fastened on a shaft 35 via a hub 34. The shaft is mounted for rotation in bearings 36 and 37 in each of the two-coil body parts 15 and 16 respectively. A pinion 13 is attached fixed on a front end of the shaft which protrudes out of the coil-body part 16.

It can furthermore be noted from FIGS. 1c, 1d and 2 that connecting pins 4-7 can be passed through bore holes, for instance 39, 39a, in the coil-body part 16 and bore holes 38-43 in the coil-body part 15 which are aligned with each other in pairs; the connecting pins serve essentially for the attachment of the arrangement, for instance, on printed circuit boards.

It can furthermore be noted from FIGS. 1c and 2 that a cylindrical screening ring 48 of ferromagnetic material can be pushed over the webs, the screening ring having a residual coercive field strength of about 5 Oe for damping the stepping motor and consist for this purpose of non-annealed low-grade iron. However, a ferromagnetic material having a high residual coercive field strength of, for instance, 50-100 Oe is used if a higher detent moment is to be achieved with the winding un-excited (currentless coils).

FIGS. 1c and 1d furthermore show details of the gearing provided in the intermediate body. It is essentially formed by the gears 49-53 and the pinions 54-57 connected to the gears 49, 50, 51, 52, the gears and pinions meshing in pairs. The pinion 13 on the shaft 35 can be inserted into the intermediate body through an opening 58 in such a manner that it comes into engagement with the first gear 49. The gear 53 on the driven shaft of the gearing is connected to the eccentrically arranged driven shaft 3.

Figure 3:
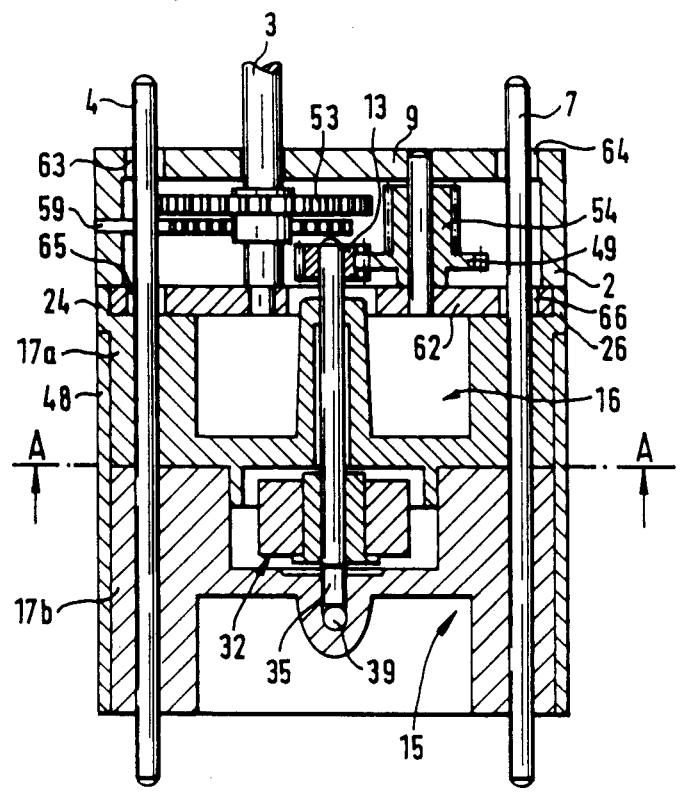

From the showing of the stepping motor arrangement in FIG. 3, which corresponds substantially to that of the basic system shown in FIG. 2, there can furthermore be noted several details of the inside of the intermediate body 2 which contains a gearing. It can be noted, in particular, from this FIG. 3 how the gears and pinions are mounted in the front plate 9 and in a corresponding wall 62 on the rear side. Furthermore, according to FIG. 3, the connecting pins (connecting pins 4 and 7 are shown in FIG. 3) extend through relatively large bore holes 63-66 in the plate 9 and wall 62 so that the position of the connecting pins are determined exclusively by the bore holes in the coil body parts 15 and 16. The bearing 36 is developed, both in FIG. 2 and FIG. 3, in such a manner that it can also take up axial forces.

Figure 4:
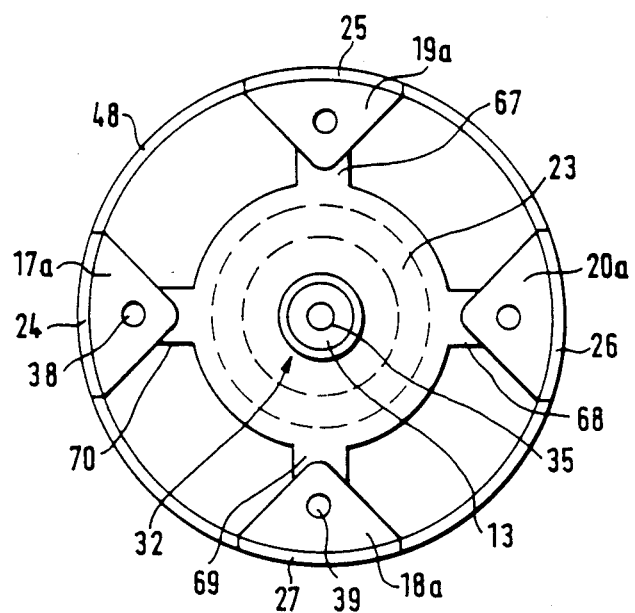
FIG. 4 is a view of the shaft side of the stepping motor of FIG. 2.

FIG. 4 is a front view of the stepping motor without attachment of the intermediate body: The webs or web sections 17a, 18a, 19a, 20a which are arranged at equal distance apart along the circumference of the substantially cylindrical coil body can be noted with the protruding clips 24-27 against the rear end sides of which the screening ring 48 which has been placed on the coil body abuts. The web sections pass into the front wall 23 at the places 67-70. The central shaft 35 on which the pinion 13 is fastened can also be noted. The rotor 2, which is concealed by the front wall 23, is merely indicated by a dashed line.

Figure 5:
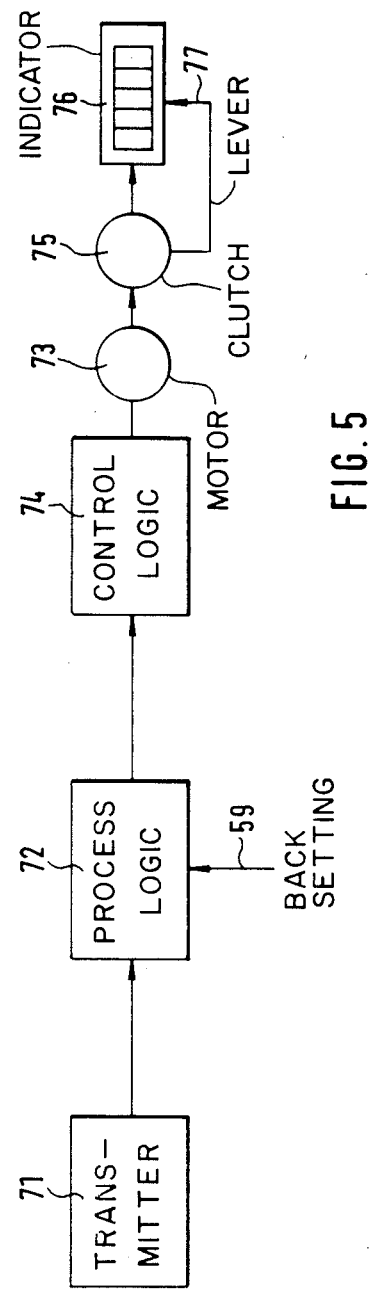
FIG. 5 is a simplified block diagram of a device provided with the stepping motor for setting a counter.

The electric control of the stepping motor can be effected to a substantial extent in conventional manner, at least for forward travel. Reference is had in this respect to FIG. 5: A transmitter, designated 71, produces pulses which are proportional, in particular, to traveled distance increments of a vehicle. Via a processing logic 72 which is connected behind the transmitter 71, the pulses for forward travel can be transmitted after formation of the pulse to a control logic 74 for the stepping motor voltages being produced in said control logic which feed the coils 10 and 11 (FIG. 1b) of the stator and which have a curved shape which causes a turning of the rotor. The processing logic 72 controls the control logic 74 in such a manner that for pulses which are given off by the transmitter 71 there is created a course of the voltage in the control logic 74 which causes a forward movement of the rotor. However, if a resetting signal is fed into a resetting input 59 of the processing logic 72, then the processing logic produces a predetermined number of pulses (pulse package) which causes the control logic 74 to give off a course of the voltages which causes a well-defined return travel of the rotor. The pulse package causes an automatic return travel within less than a second.

FIG. 5 shows diagrammatically the stepping motor 73 and the gearing with freewheel clutch 75. In forward direction of rotation the gearing displaces the rollers of the roller-type counter 76 for counting, in which case a cam disk 78 (FIG. 8) which is associated with a zeroing lever 77 of the roller-type counter is uncoupled. However, upon reverse direction of rotation of the stepping motor 73 and with the cam disk 78 engaged, the resetting takes place automatically via the zeroing lever 77.

In accordance with FIGS. 6a and 6b, voltages U for the coils 10 and 11 are produced in the control logic, the voltages causing in this case a forward rotation of the rotor. The voltages represent for the coil 10 a stepwise approximated cosine function and for coil 11 an approximated sinusoidal curve shape as a function of the numerical value$_{desired}$ to be shown. For a passage of the rotor through 360° these curve shapes of the voltages pass through a full cycle as amplitude sequence predetermined as a function of time. The amplitude sequences can also be viewed as approximated sinusoidal or cosine-shaped voltage curves shifted in phase with respect to each other. The stepwise approximation of the sine- and cosine-shape can be readily realized with digital components, for instance via a controlled duty cycle in the case of a fixed clock rate. Since the setting of the roller-type counter by the stepping motor takes place via a gearing which is contained in the intermediate body, a rough stepwise approximation is sufficient.

In the variant of FIGS. 7a and 7b, approximately tangent-shaped curve shapes are formed in the control logic 74 as voltages U for the coils 10 and 11, which curve shapes require even less expense for the production thereof than the above-mentioned sinusoidal and cosine-shaped curves.

Figure 8:
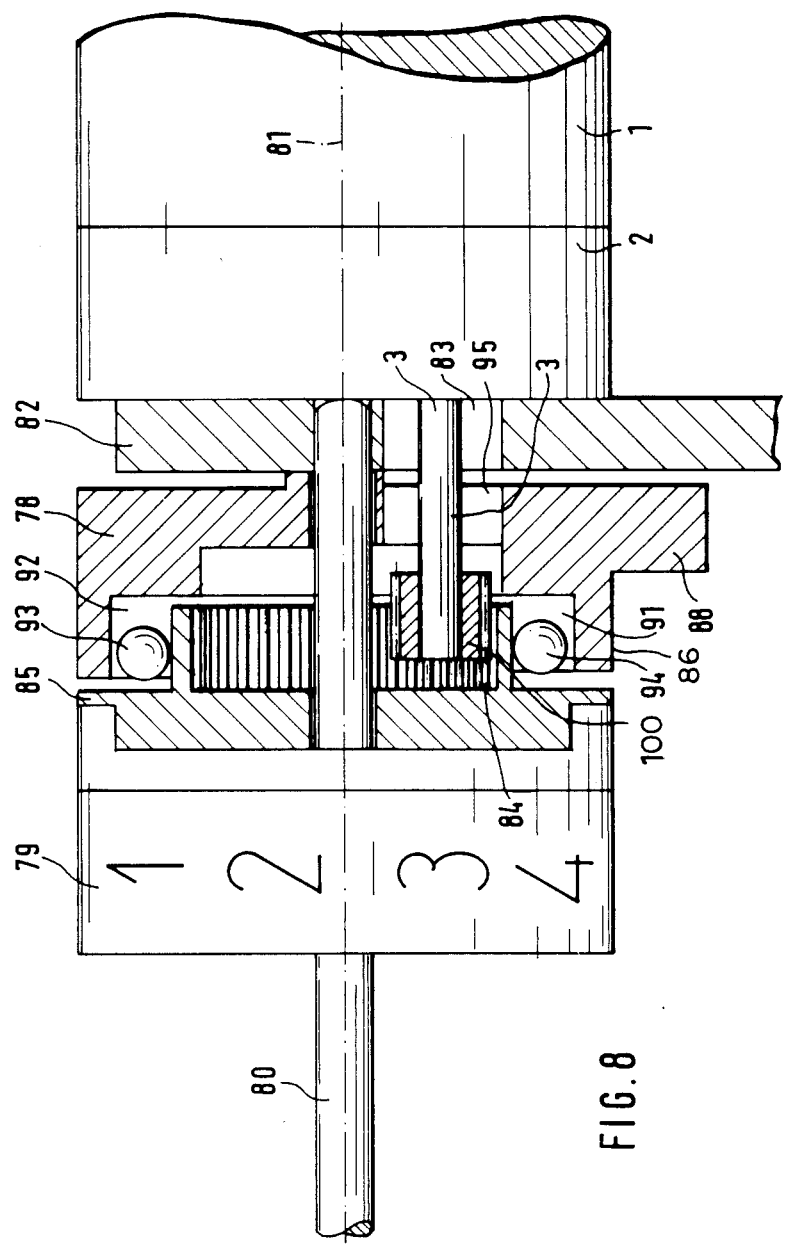
FIG. 8 shows the device for setting a resettable roller type counter, having a first driving wheel, which is shown in longitudinal section.

FIG. 8 shows on a larger scale and in longitudinal section, the device for setting a resettable roller type counter with a first drive wheel. There are not shown in the figure the right-hand part of the stepping motor 1 and the rollers of a roller-type counter, of which merely a first cipher roll 79 is shown. The cipher rolls are rotatable around a shaft 80 which is aligned with the main shaft of the gearing and of the motor. This main shaft is indicated by dash-dot line. A mounting pedestal 82 into which, for example, the connecting pins (not shown in FIG. 8)—see connecting pins 4-7 in FIG. 1a—can extend serves for the attachment of the device. The motor 1 and the gearing clipped to it are arranged to the right of the mounting pedestal. Through an opening 83 in the mounting pedestal, the driven shaft 3 of the gearing together with a pinion 100 mounted on an end thereof extend into an internal toothing 84 of a drive disk 85 which operates with a first driving wheel 86 and is connected as such to the first cipher roll 79. The first driving wheel 86 has a cam disk 78 which is also mounted on the shaft 80. The cam disk 78, which is substantially cylindrical on the outside, has a cam 88 there which can strike against a zeroing lever 89 (see FIG. 11) so as to displace the latter. The cam disk surrounds a cylindrical inner section 90 of the first drive wheel 86 from which wedge spaces 91, 92 have been cut out, the shape of which can be noted in detail from the top view of FIG. 9. The wedge shape is in this connection formed in each case towards the outside by the cylindrical inner shape of the covering section of the cam disk 78. The freewheel clutch is completed by one ball 93 and 94 each in each of the two wedge spaces 91 and 92. It is noteworthy in the showing of FIG. 8 that the motor, the gearing, the roller-type counter with the cipher roll 93 and the first driving wheel 86 form a compact, substantially cylindrical unit.

Figure 9:
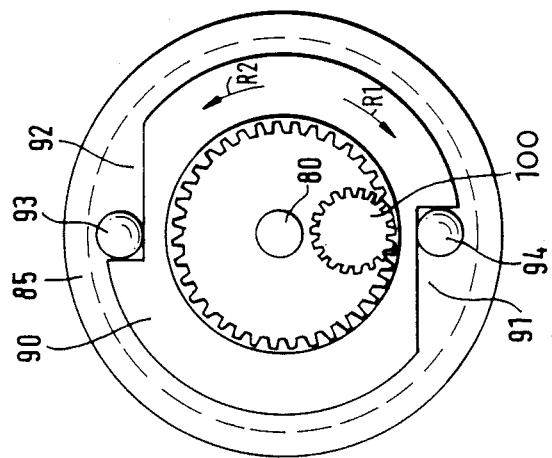
FIG. 9 shows an element of the first driving wheel, namely a drive disk with freewheel clutch, in a front view (with a section through the pinion on the driven shaft of the gearing)

Reference is had, in particular, to FIG. 9 with respect to the function of the freewheel clutch. When the first drive disk 85 is driven by the pinion 100 in the direction of the arrow R1, then the balls roll into the position in the corner of the wedge space shown in FIG. 9 and are removed from the inner surface of the covering section of the cam disk 78 which is indicated in dashed line in FIG. 9. In this direction of rotation of the stepping motor, the roller-type counter is now displaced by the first drive disk 85 in the direction of increasing numerical values while the cam disk 78 is not driven along. However, if the motor, due to a pulse package which causes the resetting, receives stator voltages which bring about a rotation of the pinion 38 in the direction R2, then the balls 93, 94 move into the tapering part of the wedge spaces 91, 92 and are wedged between the horizontal section, shown in FIG. 9, of the wedge space on the inner section 90 of the first drive disk and the cylindrical inner surface of the cam disk 78. In this case, the cam 88 in FIG. 11 is also moved in the direction R2, strikes against the zeroing lever 89 and drives the latter along into the position shown at 89a in which the zeroing lever has reset the roller-type counter via additional means, not shown.

Figure 11:
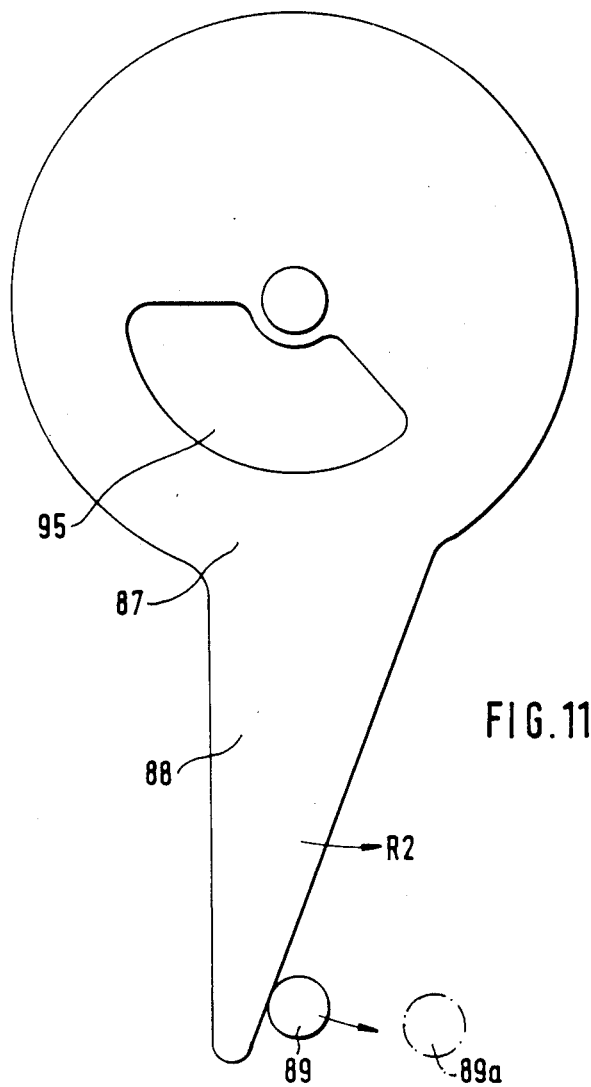
FIG. 11 is a top view of the cam disk as further element of the first driving wheel.

From FIG. 11 there can also be noted a segment-shaped opening 95 in the cam disk 78 through which the driven shaft of the gearing extends (FIG. 8). The extent of the opening 95 in circumferential direction is sufficient not to permit the driven shaft 3 to make contact since a defined path is predetermined for the resetting by the aforementioned pulse package. Once the resetting process is completed, the zeroing lever 89 can reset the cam 88 again into the position shown in FIG. 11 by means which have not been shown, and another counting process can commence.

The arrangement shown is suitable, in particular, for the resetting of a daily mileage odometer in a motor vehicle.

Figure 10:
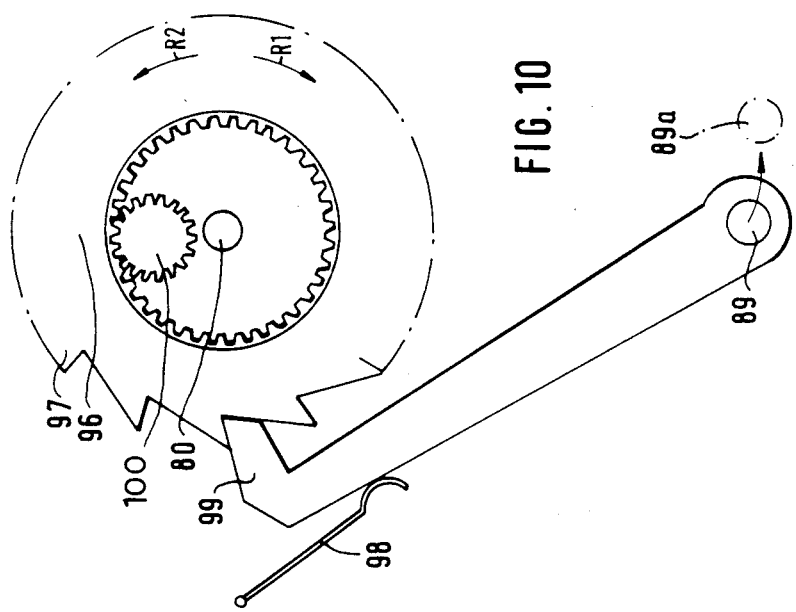
FIG. 10 is a front view of another embodiment of the first driving wheel with a ratchet and pawl mechanism.

FIG. 10 shows a variant of the freewheel clutch, which in this case is developed as ratchet and pawl mechanism. The first driving wheel is designated 96 in FIG. 10 and the pinion 100 again meshes with the internal toothing of said driving wheel. The driving wheel is rotatable around the shaft 80. The special feature of this driving wheel 96 consists in it being shaped on the outside as ratchet wheel 97. Under the pressure of a spring 98, a pawl 99 engages into the ratchets of the ratchet wheel, the pawl being swingably mounted on the zeroing lever 89.

When the first driving wheel 96 is driven in the direction R1 for displacing the counter upon the counting, then the pawl 99 slides over the teeth of the ratchet, the zeroing lever 89 remaining in the initial position shown. However, upon backward rotation of the stepping motor and thus of the pinion 100, the first driving wheel 96 is driven in the direction R2, the ratchet wheel 97 engaging with the pawl 99, which thus sets the zeroing lever into the zero position at 89a. Thus, by means not shown, in particular by heart cams, a resetting of the roller-type counter takes place by the same stepping motor as also effects the counting of the roller-type counter in a movement phase.

I claim:

1. A stepping motor drive having a cross-coil rotary magnet arrangement, the drive being suitable for setting a resettable mechanical counter, in particular a roller-type counter in a motor vehicle for measurement of distance travelled by the vehicle, the drive comprising
   a stepping motor which is formed as a two-phase stepping motor and includes a rotor comprising a shaft about which the rotor is rotatable, a permanent magnet with diametrically opposite permanent magnet poles, the motor having a coil arrangement with coils arranged at an angular distance apart of, in particular, 90°;
   a gearing which is connected to the rotor shaft, the gearing being suitable for driving a counter;
   an intermediate body, a pinion, a freewheel clutch, and a resetting device for the counter; and wherein
   the stepping motor has a coil body which is divided into two parts to receive the coils, the coil body having bearings for supporting the shaft of the rotor, the bearings allowing the shaft to protrude out of the coil body at at least one front outer end, one of the two parts of the coil body having fastening elements on the front end for the attachment of the intermediate body;
   the intermediate body surrounds the gearing;
   the end of the shaft protruding out of the front end of the coil body is secured to the pinion and engages by means of the pinion with the gearing; and
   the gearing is connected via the freewheel clutch and the resetting device to the counter.

2. A motor device according to claim 1, wherein said gearing comprises a driven shaft which extends out of said intermediate body on a side thereof facing away from said coil body, the driven shaft being arranged eccentrically to said rotor shaft.

3. A motor device according to claim 1, wherein
   said counter is a roller type counter having a first driving wheel;
   said freewheel clutch is located within said first driving wheel of the roller type counter; and
   said motor drive further comprises a drive disk joined to said first driving wheel and connected to the driven shaft of the gearing;
   a cam disk which is coaxially mounted rotatable with the drive disk and which has a cam projection which actuates said resetting device;
   at least one wedge space with a movable driving element disposed therein located at an interface between the drive disk and the cam disk; and wherein
   upon a rotation of the drive disk in a first direction, the drive disk and the cam disk are wedged against each other by the driving element; and
   upon rotation of the drive disk in a second, opposite direction of rotation, the drive disk moves freely with respect to the cam disk.

4. A motor device according to claim 3, wherein
   two diametrically opposite wedge spaces are formed in a cylindrical inner part of the drive disk; and
   the cam disk partially surrounds the cylindrical inner part.

5. A motor device according to claim 4, wherein the movable driving element comprises a ball.

6. A motor device according to claim 3, wherein the movable driving element comprises a ball.

7. A motor device according to claim 3, wherein the movable driving element comprises a roller.

8. A motor device according to claim 4, wherein the movable driving element comprises a roller.

9. A motor device according to claim 4, wherein the movable driving element is a wedge.

10. A motor device according to claim 3, wherein the movable driving element is a wedge.

11. A motor device according to claim 3, wherein the freewheel clutch is developed as a ratchet and pawl mechanism on said first drive wheel of the counter, which mechanism comprises a ratchet wheel on the first driving wheel as well as a pawl which engages into the ratchet wheel and is connected to said resetting device.

12. A motor device according to claim 4, wherein the freewheel clutch is developed as a ratchet and pawl mechanism on said first drive wheel of the counter, which mechanism comprises a ratchet wheel on the first driving wheel as well as a pawl which engages into the ratchet wheel and is connected to said resetting device.

13. A motor device according to claim 1, wherein the coil body is divided essentially in a plane transverse to an axis of rotation of said rotor.

14. A motor device according to claim 13, wherein the bearings are disposed in respective ones of the coil body parts.

15. A motor device according to claim 1, wherein the coil body is formed cylindrically on the inside with four webs arranged at equal distances apart over the circumference and extending cylindrically on the outside, there being a screening ring which is in alignment with the intermediate body, and can be pushed concentrically over the coil body.

16. A motor device according to claim 15, wherein said fastening elements provided on the coil body are nose-shaped clips for a clamping attachment of the intermediate body.

17. A motor device according to claim 16, wherein the concentric screening ring on the coil body abuts axially against a raised inner side of the clips.

18. A motor device according to claim 1, wherein said coil body is provided with bore holes; and
said motor drive includes connecting pins which pass through the bore holes parallel to the shaft, and extend at least from one outer side of the coil body.

* * * * *